United States Patent
Kalia et al.

(10) Patent No.: US 11,922,181 B2
(45) Date of Patent: Mar. 5, 2024

(54) CONFIGURATION DISCOVERY OF COMPUTER APPLICATIONS

(71) Applicant: International Business Machines Corporation, Armonk, NY (US)

(72) Inventors: Anup Kalia, White Plains, NY (US); John Rofrano, Mahopac, NY (US); Jin Xiao, White Plains, NY (US); Mihir Choudhury, Jersey City, NJ (US); Elizabeth Daly, Dublin (IE); Oznur Alkan, Clonsilla (IE); Lambert Pouguem Wassi, Yonkers, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 17/474,567

(22) Filed: Sep. 14, 2021

(65) Prior Publication Data
US 2023/0085488 A1    Mar. 16, 2023

(51) Int. Cl.
*G06F 9/24* (2006.01)
*G06F 8/33* (2018.01)
(Continued)

(52) U.S. Cl.
CPC ............ *G06F 9/44505* (2013.01); *G06F 8/33* (2013.01); *G06N 5/02* (2013.01); *G06F 9/4401* (2013.01)

(58) Field of Classification Search
CPC .......... G06F 9/44505; G06F 8/33; G06F 8/76; G06N 5/02

(Continued)

(56) References Cited

U.S. PATENT DOCUMENTS 9,069,607 B1   6/2015  Gopalakrishna Alevoor et al.
10,073,974 B2  9/2018  Hwang et al.
(Continued)

FOREIGN PATENT DOCUMENTS

CN    105847045 B    6/2019
CN    110502577 A    11/2019

OTHER PUBLICATIONS hub.docker.com, "websphere-liberty," ebSphere Liberty multi-architecture images based on Ubuntu 18.04, https://hub.docker.com/_/websphere-liberty, Retrieved from the Internet Aug. 20, 2021, 10 pages.

(Continued)

*Primary Examiner* — Volvick Derose
(74) *Attorney, Agent, or Firm* — Amin, Turocy & Watson, LLP

(57) ABSTRACT

Techniques regarding discovering configuration information for one or more computer applications are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a configuration component that can discover configuration information associated with a containerized computer application. The configuration information can be characterized by a set of environment attributes extracted by querying a source code of the containerized computer application.

20 Claims, 14 Drawing Sheets

(51) Int. Cl.
 *G06F 9/445* (2018.01)
 *G06N 5/02* (2023.01)
 *G06F 9/4401* (2018.01)

(58) Field of Classification Search
 USPC .......................................................... 713/1
 See application file for complete search history.

(56) References Cited

U.S. PATENT DOCUMENTS

| | | | |
|---|---|---|---|
| 10,146,599 | B2 | 12/2018 | Bellomo et al. |
| 10,536,518 | B1* | 1/2020 | Streete ................ H04L 67/1095 |
| 10,540,191 | B2 | 1/2020 | Christensen |
| 10,901,966 | B2 | 1/2021 | Wang et al. |
| 10,999,152 | B1* | 5/2021 | Bar Oz ................... H04L 41/22 |
| 2010/0106821 | A1* | 4/2010 | Akiyama ............ G06F 9/44505 |
| | | | 709/224 |
| 2011/0131300 | A9* | 6/2011 | Akiyama ............. G06F 16/288 |
| | | | 709/220 |
| 2015/0293760 | A1 | 10/2015 | Alevoor et al. |
| 2016/0132808 | A1* | 5/2016 | To .................... G06Q 10/06315 |
| | | | 705/7.25 |
| 2017/0034016 | A1* | 2/2017 | Carroll .................. H04L 43/026 |
| 2017/0373932 | A1* | 12/2017 | Subramanian ...... H04L 41/0895 |
| 2018/0025160 | A1 | 1/2018 | Hwang et al. |
| 2018/0060059 | A1* | 3/2018 | Wang ................... G06F 9/45558 |
| 2018/0157543 | A1* | 6/2018 | Bellomo ................. G06F 9/546 |
| 2018/0373551 | A1* | 12/2018 | Christensen ........ G06F 9/44505 |
| 2020/0050464 | A1* | 2/2020 | Yankovich ............ G06F 9/4451 |
| 2020/0125351 | A1* | 4/2020 | Zlatnik .................. H04L 67/51 |
| 2020/0201887 | A1* | 6/2020 | Bar Oz .................. G06F 16/25 |
| 2020/0204443 | A1* | 6/2020 | Bar Oz .................. H04L 67/34 |
| 2021/0083945 | A1* | 3/2021 | Bitterfeld ............. G06F 16/355 |
| 2021/0203731 | A1* | 7/2021 | Garty .................. H04L 41/0853 |
| 2022/0103433 | A1* | 3/2022 | Akhilesham ............. G06N 5/01 |
| 2023/0214333 | A1* | 7/2023 | Glimcher ............ H04L 41/0803 |
| | | | 710/74 |

OTHER PUBLICATIONS hub.docker.com, "ibmcom/db2," Db2—The AI Database, https://hub.docker.com/r/ibmcom/db2\n3, Retrieved from the Internet Aug. 20, 2021, 2 pages.

hub.docker.com, "ibmcom/websphere-traditional," Official IBM WebSphere Application Server traditional image, https://hub.docker.com/r/ibmcom/websphere-traditional/, Retrieved from the Internet Aug. 20, 2021, 4 pages.

hub.docker.com, "tomcat," Apache Tomcat is an open source implementation of the Java Servlet and JavaServer Pages technologies, https://hub.docker.com/_/tomcat, Retrieved from the Internet Aug. 20, 2021, 8 pages.

hub.docker.com, "mysql," MySQL is a widely used, open-source relational database management system (RDBMS), https://hub.docker.com/_/mysql, Retrieved from the Internet Aug. 20, 2021, 10 pages.

hub.docker.com, "mongo," MongoDB document databases provide high availability and easy scalability, https://hub.docker.com/_/mongo, Retrieved from the Internet Aug. 20, 2021, 11 pages.

hub.docker.com, "node," Node.js is a JavaScript-based platform for server-side and networking applications, https://hub.docker.com/_/node/, Retrieved from the Internet Aug. 20, 2021, 6 pages.

Mel, et al., "The NIST Definition of Cloud Computing," Special Publication 800-145, Recommendations of the National Institute of Standards and Technology, Sep. 2011, 7 pages.

* cited by examiner

| 402 | Predefined <key,value> pairs | User Defined <key, value> pairs |
|---|---|---|
| WebSphere-liberty | FROM: websphere-liberty kernel | COPY: path to EAR or WAR<br>COPY: path to server.xml |
| WebSphere-traditional | FROM: ibmcom/websphere-traditional:latest | COPY: path to EAR or WAR<br>COPY: path to server.xml |
| Tomcat | FROM:tomcat:8.0.20-jre28<br>WORKDIR:$CATALINA_HOME/webapps/ | ADD: path to lib<br>COPY: path to WAR |
| MySQL | FROM: mysql:latest | ENV MYSQL_DATABASE= database name<br>ENV MYSQL_USER= username<br>ENV MYSQL_PASSWORD = password |
| MongoDB | ENV MONGO_PORT= 27017 | ENV MONGO_HOST= host name<br>ENV MYSQL_DBNAME= database name |
| DB2 | FROM: ibmcom:db2 | ENV MONGO_HOST= host name<br>ENV MYSQL_DBNAME= database name |

FIG. 4

CONFIGURATION DISCOVERY OF COMPUTER APPLICATIONS

BACKGROUND

The subject disclosure relates to configuration discovery for containerized computer applications, and more specifically, to a data driven discovery of configuration settings for a group of computer applications, including legacy applications.

Legacy applications can include computer applications that have become outdated with time (e.g., with regards to function, deployment, and/or platform). Legacy applications can be modernized for deployment in one or more updated computer environments. For example, a legacy application can be modernized for deployment in a cloud computing environment. Modernizing the computer applications can including capturing the computer applications via one or more container images via one or more containerization techniques. However, containerization techniques can fail to encompass configuration settings for efficiently executing the container image variables in the target computer environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate configuration information discovery are described.

According to an embodiment, a system is provided. The system can comprise a memory that stores computer executable components. The system can also comprise a processor, operably coupled to the memory, and that can execute the computer executable components stored in the memory. The computer executable components can comprise a configuration component that can discover configuration information associated with a containerized computer application. The configuration information can be characterized by a set of environment attributes extracted by querying a source code of the containerized computer application. An advantage of such a system can be facilitating the modernization of one or more legacy application.

In some examples, the system can comprise an application containerization advisory component that can identify a container for a computer application based on a knowledge graph and application information that characterizes one or more dependencies of the computer application. An advantage of such a system can be an automated containerization of legacy computer applications.

According to an embodiment, a computer-implemented method is provided. The computer-implemented method can comprise discovering, by a system operatively coupled to a processor, configuration information associated with a containerized computer application. The configuration information can be characterized by a set of environment attributes extracted by querying a source code of the containerized computer application. An advantage of such a computer-implemented method can be the automated discovery of configuration information across a portfolio of legacy applications.

In some examples, the computer-implemented method can further comprise identifying, by the system, a container for a computer application based on a knowledge graph and application information that characterizes one or more dependencies of the computer application. Also, the computer-implemented method can comprise extracting, by the system, an environment attribute from an image file of the container, wherein the environment attribute is defined by a key and value pairing. An advantage of such a computer-implemented method can be the incorporation of container attributes in discovering the configuration information.

According to an embodiment, a computer program product for computer application configuration discovery is provided. The computer program product can comprise a computer readable storage medium having program instructions embodied therewith. The program instructions can be executable by a processor to cause the processor to discover, by the processor, configuration information associated with a containerized computer application, wherein the configuration information is characterized by a set of environment attributes extracted by querying a source code of the containerized computer application. An advantage of such a computer program product be the automated modernization of legacy applications.

In some examples, the program instructions can further cause the processor to generate, by the processor a candidate list of key and value pairings based on a plurality of environment attributes extracted from the computer application. Also, the program instructions can cause the processor to validate, by the processor, the candidate list via an active learning model. An advantage of such a computer program product can be the use of active learning to enhance the accuracy of configuration information discovery.

BRIEF DESCRIPTION OF THE DRAWINGS

FIG. 4 illustrates a diagram of example, non-limiting predefined and/or user defined environment attributes that can be extracted for configuration discovery in accordance with one or more embodiments described herein.

DETAILED DESCRIPTION

Figure 1:
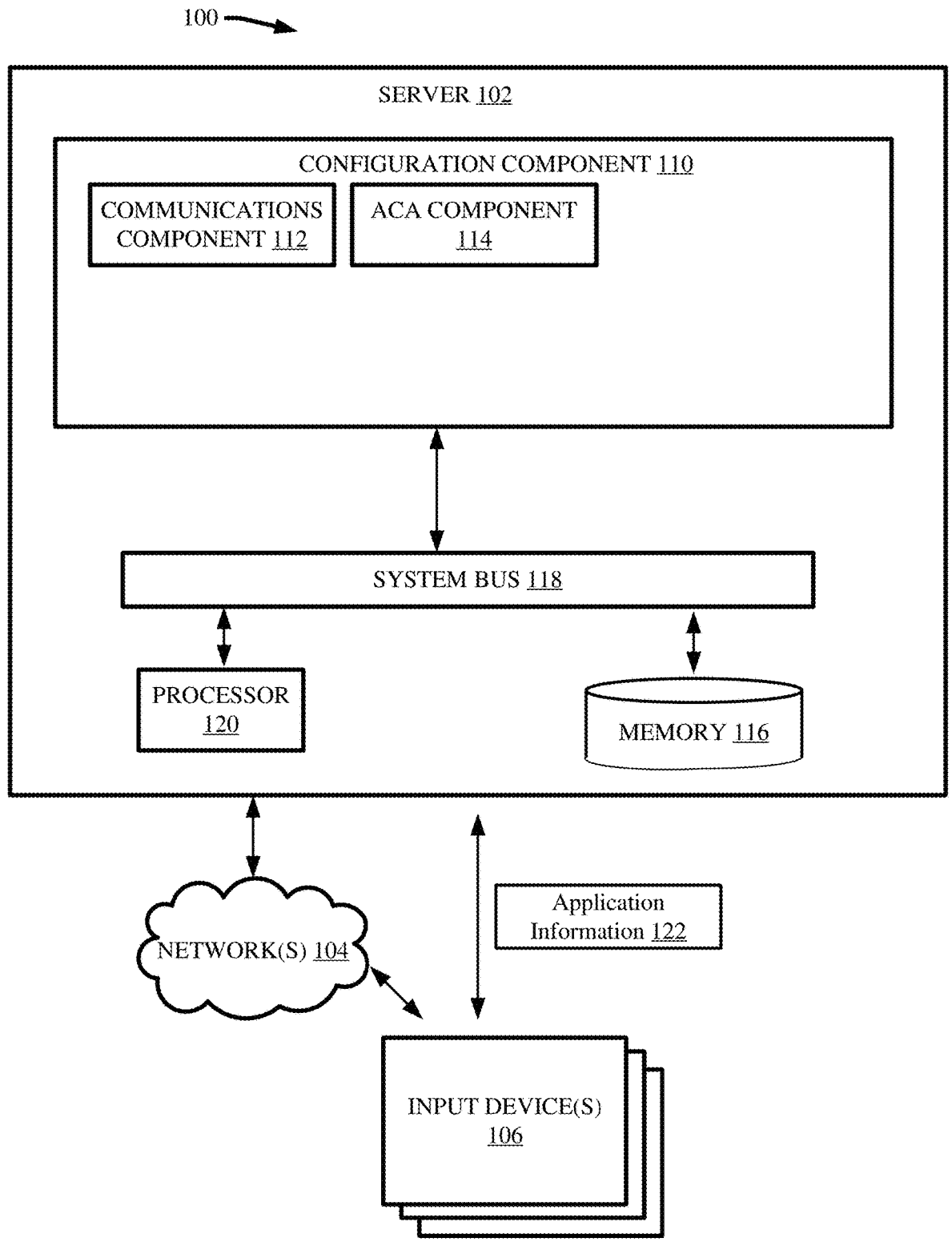
FIG. 1 illustrates a block diagram of an example, non-limiting system that can discover configuration information for one or more containerized computer applications in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of modernizing legacy applications; the present disclosure can be implemented to produce a solution to one or more of these problems by discovery one or more configuration settings associated with a containerized computer application for deployment in a target computer environment. Advantageously, one or more embodiments described herein can employ a one or more active learning models to further enhance configuration discovery beyond a rule-based approach. Further, one or more embodiments described herein can be employed to discover configuration settings despite: respective configuration settings having different expressions depending on origin; configuration settings being located within various kinds of documents (e.g., can lack standardization); environmental attributes varying from one computer application to another; and/or environmental attributes being hardcoded into the computer application's source code.

Various embodiments of the present invention can be directed to computer processing systems, computer-implemented methods, apparatus and/or computer program products that facilitate the efficient, effective, and autonomous (e.g., without direct human guidance) configuration discovery of one or more legacy applications. For example, one or more embodiments described herein can identify configuration information regarding one or more computer applications (e.g., legacy applications). For instance, the configuration information can be identified via an extraction of: pre-defined attributes from container images; and/or user specified attributes, which can be extracted via a graph-based feature extraction technique from various components of the computer application. Additionally, extracted attributes can be validated via one or more active learning models, where the validated attributes can be further mapped to target containers to generate one or more deployment files. The deployment files can include, for example, configuration information expressed as the mapped attributes for deployment of the respective container on a target computer environment.

The computer processing systems, computer-implemented methods, apparatus and/or computer program products employ hardware and/or software to solve problems that are highly technical in nature (e.g., computer application configuration discovery), that are not abstract and cannot be performed as a set of mental acts by a human. For example, an individual, or a plurality of individuals, cannot readily employ graph-based feature extraction to parse one or more computer applications and determine configuration information for a targeted deployment of the computer applications in a modernized computer environment. Also, one or more embodiments described herein can constitute a technical improvement over conventional configuration information discovery by employ by employing one or more graph-based feature extraction techniques to identify computer environment attributes that can be further validated via one or more active learning models. Further, one or more embodiments described herein can have a practical application by facilitating the modernization of one or more legacy applications for deployment in one or more target computer environments, such as a cloud computing environment. For instance, various embodiments described herein can discover configuration information for one or more legacy applications that can facilitate the efficient deployment and/or execution of the one or more legacy application in a modernized computer environment.

FIG. 1 illustrates a block diagram of an example, non-limiting system 100 that can discover configuration information for one or more (e.g., a portfolio) of computer applications (e.g., legacy applications). Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, and/or input devices 106. The server 102 can comprise configuration component 110. The configuration component 110 can further comprise communications component 112 and/or application containerization advisory ("ACA") component 114. Also, the server 102 can comprise or otherwise be associated with at least one memory 116. The server 102 can further comprise a system bus 118 that can couple to various components such as, but not limited to, the configuration component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the configuration component 110 can be provided on the one or more servers 102, it should be appreciated that the architecture of system 100 is not so limited. For example, the configuration component 110, or one or more components of configuration component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter application information 122 regarding one or more computer applications into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, an entity can enter application information 122 regarding one or more computer applications (e.g., a portfolio of legacy applications) into the system 100 via the one or more input devices 106. For example, the application information 122 can be entered into the system 100 via questionnaires, infrastructure data, and/or static analysis. For instance, the application information 122 can include text descriptions of the one or more computer applications (e.g., via Bluecat, Pathfinder, a combination thereof, and/or the like). In another instance, the application information 122 can include infrastructure data such as application dependencies (e.g., via a configuration management database ("CMBD"), a Bluecat tool, an application inventory tool, an excel file, a combination thereof, and/or the like). In a further instance, the application information 122 can include application data via, for example: CAST highlights, transfer agents ("TA"), message transfer agents ("MTA"), static and/or dynamic analyzers of application source code, a combination thereof and/or the like. For example, the application information 122 can include data describing where the one or more computer applications are deployed, dependencies of the one or more computer applications, and/or subject matter expert ("SME") survey data regarding the one or more computer applications. In another example, the application information 122 can include software artifacts (e.g., source code artifacts), data regarding one or more properties of the one or more computer applications, and/or deployment data regarding the one or more computer applications).

In one or more embodiments, the ACA can generate one or more container recommendations based on the application information 122 and one or more knowledge graphs ("KG"). The one or more KGs can provide a graphical representation of data through identified entities and relations. In various embodiments, the entities can characterize data (e.g., from the application information 122) regarding the one or more computer applications, including, but not limited to: operating system information, application data, one or more databases, middleware, a combination thereof, and/or the like. In one or more embodiments, the relations can characterize one or more dependencies of the one or more applications. For instance, an example relation can include: an application "runs on" an operating system (that is, "runs on" is a relation between a given computer application and a given operating system upon which the computer application is executed). In various embodiments, the knowledge graph can represent the entities via one or more nodes and the relations via one or more connections and/or edges of the graph.

In one or more embodiments, the ACA component 114 can perform a data standardization of the application information 122. For example, the ACA component 114 can curate the application information 122 by, for example, extracting one or more components of the application information 122, such as: database, middlewares, and/or other related information from application information 122. Additionally, the ACA component determine (e.g., infer) missing inputs in the application information 122 using one or more KG-based reasoning techniques. For example, given the input ".NET Framework" from the application information 122, the ACA component 114 can determine that the operating system for the given computer application can be Windows based on the one or more KGs. In one or more embodiments, the ACA component 114 can perform data standardization by employing one or more natural language processing techniques, such as "Named-entity recognition"; where the ACA component 114 can recommend a version and/or variant from an input. For example, given the input "red hat v6.9" from the application information 122, the ACA component 114 can identify the variant as Red Hat Linux and the version as 6.9, respectively.

In various embodiments, the ACA component 114 can generate one or more container recommendations to optimize modernization of the one or more computer applications characterized by the application information 122. Further, the ACA component 114 can generate one or more recommendations regarding the disposition for application information 122, such as whether a computer application is recommended for containerization, refactorization, repackaging, or kept as it is. For example, the ACA component 114 can consider application details (e.g., the application's technology stack) as one or more input variables, then map the input variables to named entities present in one or more KGs. Once the named entities are mapped, the ACA component 114 can generate one or more container recommendations. Based on containers recommended for an application, the ACA component 114 can further determine the disposition information. Also, for container recommendations, the ACA component 114 can store information about candidate container images from a data repository (e.g., DockerHub and/or Openshift) in the one or more KGs.

Figure 2:
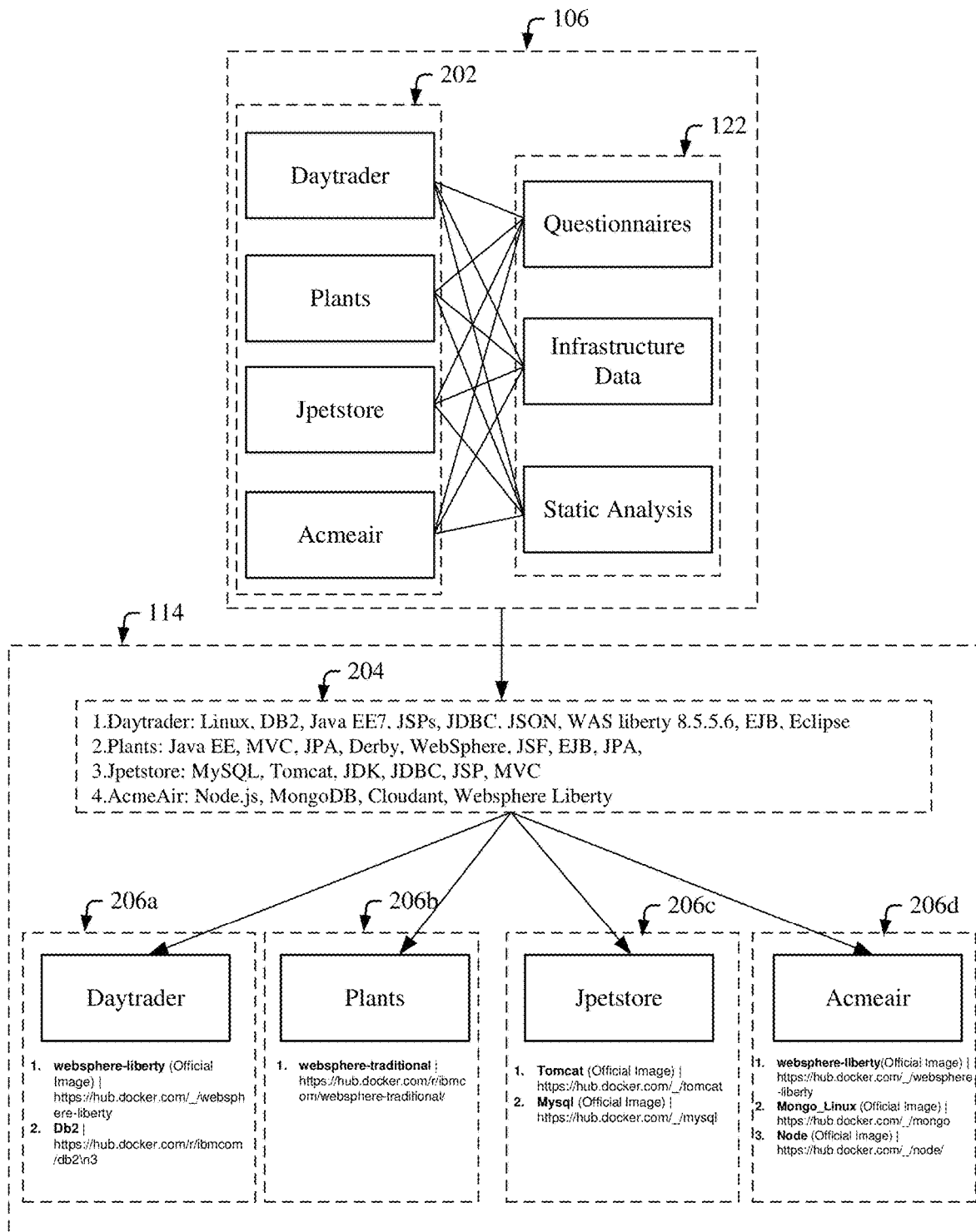
FIG. 2 illustrates a diagram of an example, non-limiting process for identifying one or more containers for one or more computer applications in accordance with one or more embodiments described herein.

FIG. 2 illustrates a diagram of the example, non-limiting system 100 comprising operations by the one or more input devices 106 and/or ACA component 114 in accordance with one or more embodiments described herein. Repetitive description of like elements employed in other embodiments described herein is omitted for the sake of brevity. FIG. 2 depicts an example application portfolio 202 of legacy applications (e.g., J2EE applications) including computer applications entitled: "Daytrader", "Plants", "Jpetstore", and "Acmeair".

As shown in FIG. 2, application information 122 can be collected via the application portfolio 202 based on, for example: questionnaires, infrastructure data, and/or static analysis. In various embodiments, the ACA component 114 can analyze the application information and generate one or more profiles 204 for each of the computer applications. For instance, the ACA component 114 can standardize the data of the application information 122 into one or more templates to generate the respective profiles 204. In accordance with various embodiments described herein, the ACA component 114 can further generate one or more container recommendations (e.g., recommendations 206a, 206b, 206c, 206d) to facilitate a containerization of each of the computer application of the application portfolio 202 (e.g., thereby facilitating modernization of the application portfolio 202). The container recommendations can delineate, for example, recommended container images (e.g., Apache Tomcat and/or MySQL from Docker Hub) based on the application information.

Figure 3:
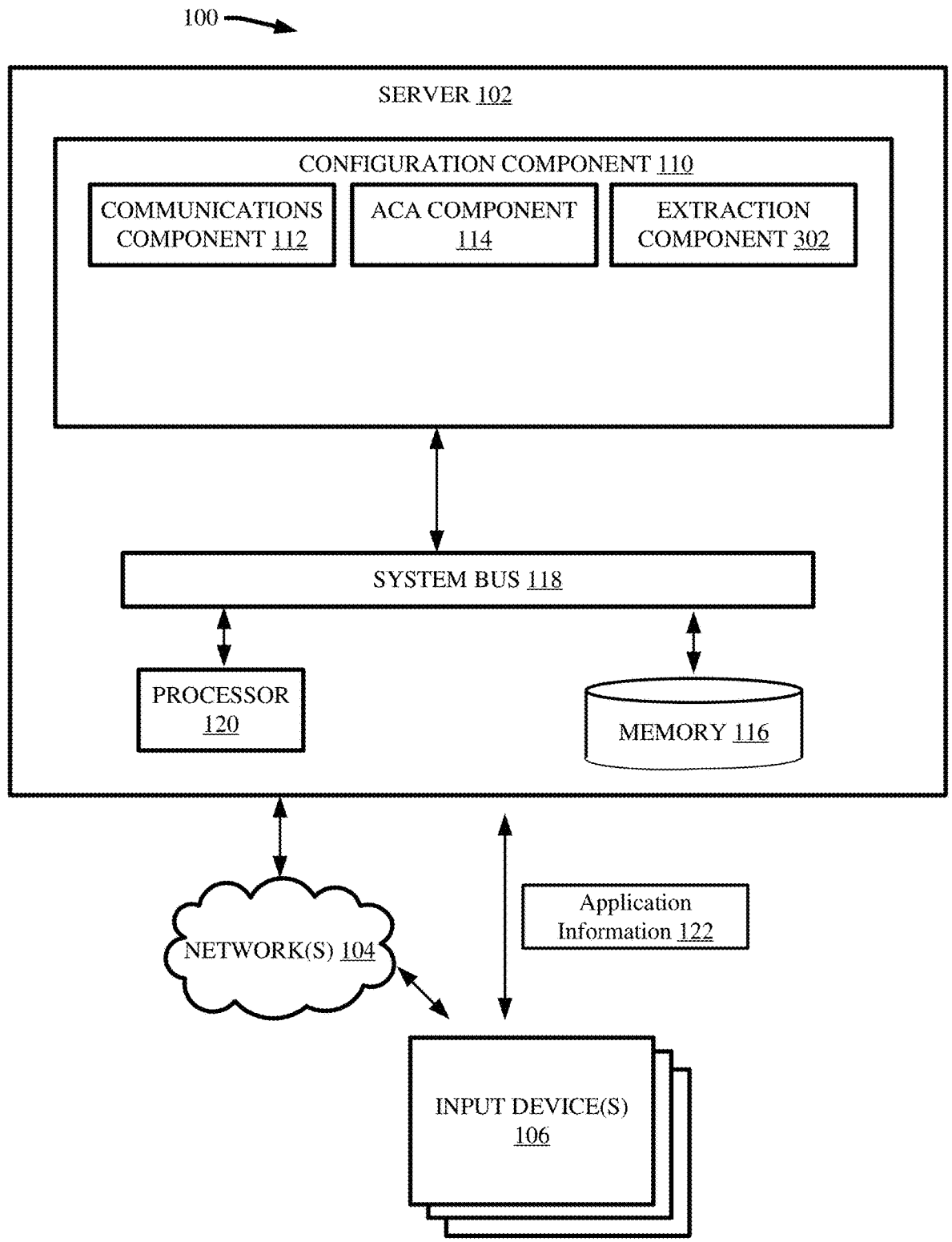
FIG. 3 illustrates a block diagram of an example, non-limiting system that can extract one or more environment attributes from container images and/or application information in accordance with one or more embodiments described herein.

FIG. 3 illustrates a diagram of the example, non-limiting system 100 further comprising extraction component 302 in accordance with one or more embodiments described herein. Repetitive description of like elements employed in other embodiments described herein is omitted for the sake of brevity. In various embodiments, the extraction component 302 can extract environment attributes from the one or more container recommendations (e.g., generated by the ACA component 114) and/or associate deployment files.

In various embodiments, environmental attributes can be represented as <key, value> pairs, where the "key" can represent the attributes name and the "value" can represent the attribute's value with the context of the given computer application and/or container. Further, the environmental attributes can be predefined attributes and/or user defined attributes. Example predefined attributes can include, but are not limited to: "_ENV MONGO_PORT" as 27017 for MongoDB, "FROM" as mysql_latest for MSQL, "FROM_ibmcom:db2" for DB2, a combination thereof, and/or the like. Example user defined attributes can include, but are not limited to: account credentials (e.g., usernames and/or passwords), ENV MYSQL_DATABASE, ENV MYSQL_USER, ENV MYSQL_PASSWORD for MySQL, a combination thereof, and/or the like. In one or more embodiments, the one or more environmental attributes can be extracted from the one or more containers, public repositories, and/or computer applications. For example, FIG. 4 depicts exemplary containers 402 into which the one or more computer applications can be containerized, along with example predefined <key, value> pair extractions and/or user defined <key, value> pair extractions. Repetitive description of like elements employed in other embodiments described herein is omitted for the sake of brevity.

Figure 5:
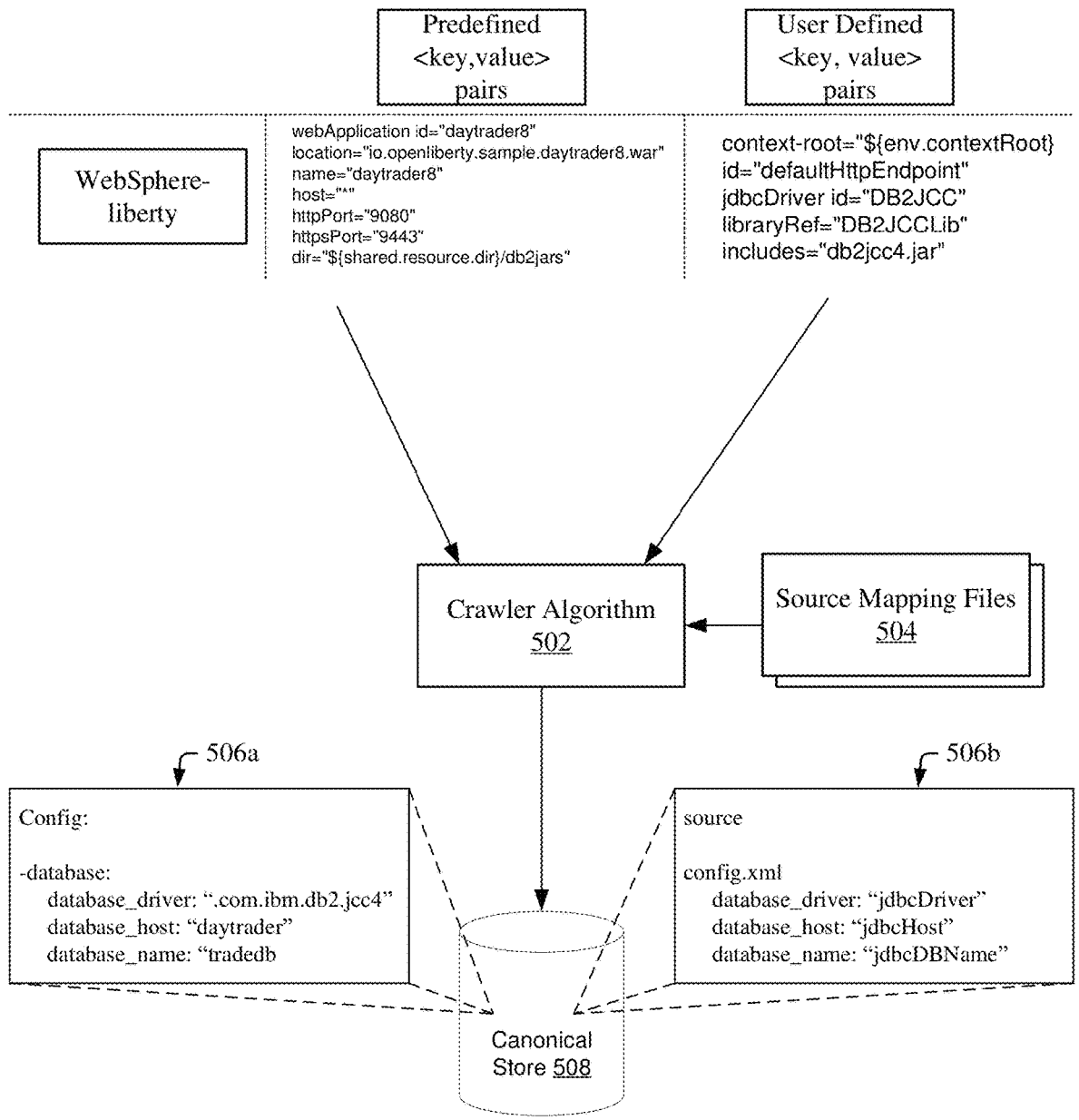
FIG. 5 illustrates a diagram of an example, non-limiting extraction process that can facilitate extracting one or more environment attributes from one or more container image descriptions in accordance with one or more embodiments described herein.

In one or more embodiments, the extraction component 302 can employ one or more crawler algorithms 502 (e.g., a configuration crawler algorithm) to crawl one or more predefined and/or user defined attributes from the container image descriptions for each of the computer applications. For example, FIG. 5 depicts an exemplary environment attribute extraction 500 that can be performed by the extraction component 302. For instance, the extraction component 302 can utilize one or more source mapping files 504 to map the values of the extracted environment attributes to canonical data 506 (e.g., as exemplified by first example canonical data 506a and/or second example canonical data 506b), which can be stored in a canonical storage 508 (e.g., located in the one or more memories 116). The one or more source mapping files 504 can be created by one or more SMEs and entered into the system 100 via the one or more input devices 106. For instance, the one or more source mapping files 504 can be represented terms of yet another markup language ("YAML") files. In one or more embodiments, the one or more source mapping files 504 can be generated and/or edited by a community of entities familiar with the given framework. The one or more source mapping files 504 can contain one or more relationships between the source format (e.g., crawled by the one or more crawler algorithms 502) and the canonical data 506 (e.g., stored in the canonical storage 508). The basis for the one or more source mapping files 504 can be the canonical format. For example, if the canonical name for the database user identification is "database.user", then the one or more source mapping files 504 can map the variable in the framework that characterizes the user identification to "database.user" (e.g., similar to environment variable mapping).

Figure 6:
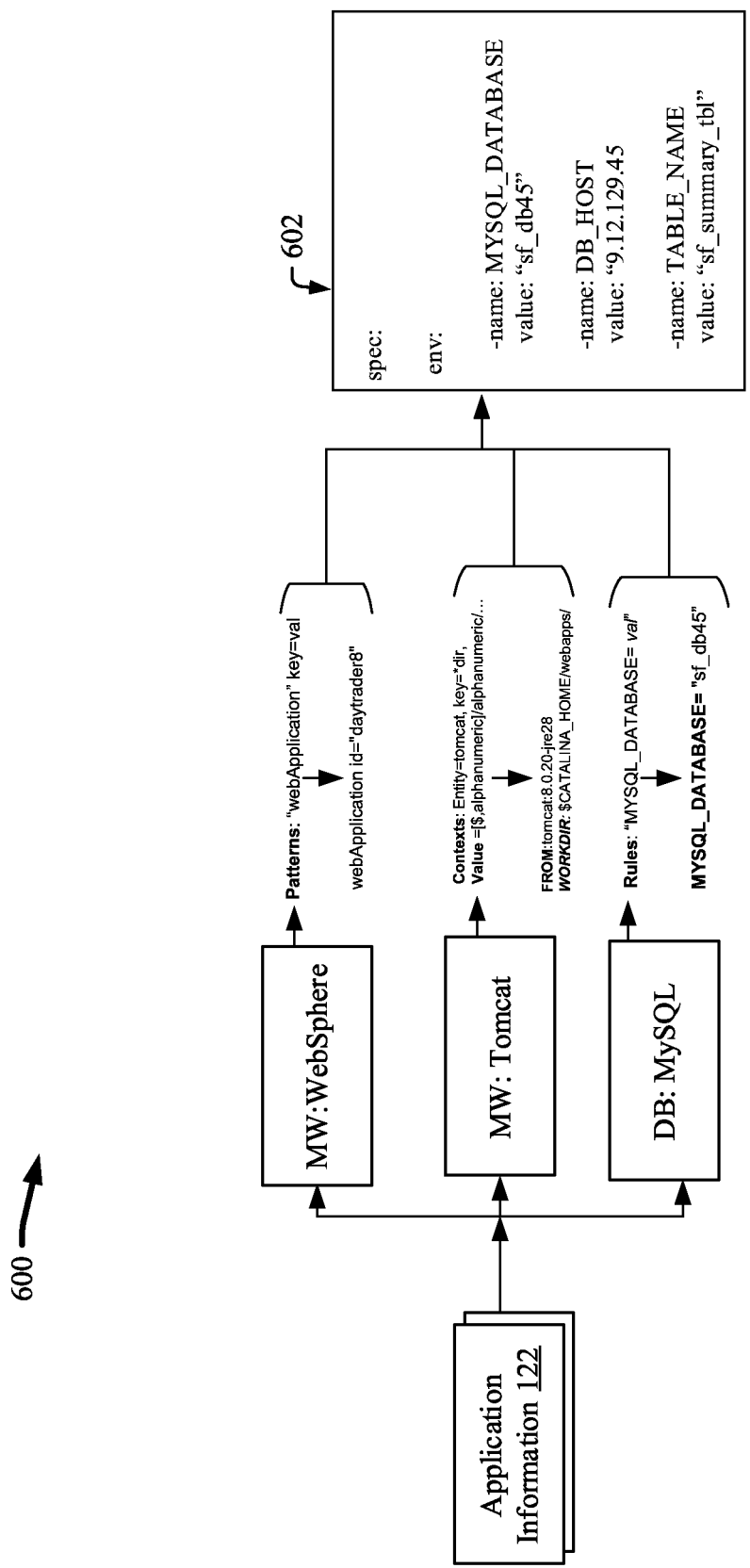
FIG. 6 illustrates a diagram of an example, non-limiting extraction process that can facilitate extracting one or more environment attributes from one or more one or more computer applications in accordance with one or more embodiments described herein.

FIG. 6 illustrates a diagram of another example, environment attribute extraction 600 that can be performed by the extraction component 302 in accordance with one or more embodiments described herein. Repetitive description of like elements employed in other embodiments described herein is omitted for the sake of brevity. In one or more embodiments, the extraction component 302 can extract one or more environment attributes from the application information 122.

For instance, application information 122 collected via one or more questionnaires can identify one or more entities absent from configuration data and/or provide search context regarding: where configuration information resides, code properties, configuration files, web application data (e.g., XMLs), a combination thereof and/or the like. In another instance, infrastructure data included in the application information 122 can delineate one or more application dependencies, such as the identification of one or more application outgoing ports. In a further instance, the application information 122 can be analyzed via one or more static program analysis techniques to extract one or more environment attributes.

In one or more embodiments, the extraction component 302 can perform a rule-based search of the computer application and/or application information 122, which can allow fuzzy search of a specific key and returns the value associated with the matched key. This can be used for application-specific keys such as MYSQL_DATABASE. In one or more embodiments, the extraction component 302 can specify this search key as "mysql database" or "mysql db" and/or the like. In one or more embodiments, the extraction component 302 can perform a pattern-based search by looking for rules in lines that fuzzy match a specific pattern. For instance, in the case of webApplication id="daytrader8", performing a rule-based search for "id" can return numerous results that may not be relevant to desired attribute extraction. Pattern-based search can provide the appropriate level of filtering for such search queries by requiring that the rule occurs in the same line as a specific pattern, in this case "webApplication'". In the case of rule-based fuzzy matching, the extraction component 302 can specify the pattern as, for example, "web application" or "web app". In one or more embodiments, the extraction component 302 can perform a context-based search that can search for one or more keys in the hierarchical context of a configuration file. The context for the target rule may occur in the adjacent line or even several lines away from the specified context. For instance, consider the following example:

FROM:tomcat:8.0.20-jre28
WORKDIR: $CATALINA_HOME/webapps/

The extraction component 302 can look for the working directory for tomcat server.

A configuration file can have a hierarchical structure (e.g., based on the indentation of lines and/or by using special tokens such as '-' or using brackets to identify sections). Such hierarchical information can be captured in a graph structure (e.g., a configuration graph), and graph neural networks ("GNNs") can be used to implement rule-based, pattern-based, and/or context-based fuzzy searches. GNNs can use training data to learn patterns within the configuration graph. The trained model can then be used to implement fuzzy rule-based, pattern-based, and context-based searches for configuration information.

In one or more embodiments, the extraction component 302 can search entirety, or near entirety (e.g., source code, configuration files, deployment files, a combination thereof, and/or the like included in the application information 122), of a given computer application (e.g., a legacy application) using the key of the one or more environment attributes as the query to localize the possible position of the environment attribute's value component. As exemplified in FIG. 6, the extraction component 302 can employ one or more graph-based feature extraction techniques to query the application information 122 and localize potential keys and values in consideration for the query. Further, the extraction component 302 can employ a fuzzy value search method to rank and/or recommend one or more values for the one or more environment attributes. Also shown in FIG. 6, the extracted <key, value> pairs can be formatted into one or more standardized templates 602. The fuzzy search can yield one or more relevant environment attributes with a value for a given query. Based on one or more associate confidence metrics, determined values for the one or more environment attributes can be accepted or rejected (e.g., based on a defined threshold for the associate confidence metric). Further, the query search can facilitate locating the position of one or more environment attributes present in the computer application.

In one or more embodiments, the extraction component 302 can generate one or more additional questionnaires to collect application information regarding environment attribute values missing from the populated templates. For example, one or more questionnaires generated by the extraction component 302 can be shared (e.g., via the one or more networks 104) with the one or more input devices 106 to collect the value data directly and/or collect information regarding the context of the value data's location.

Figure 7:
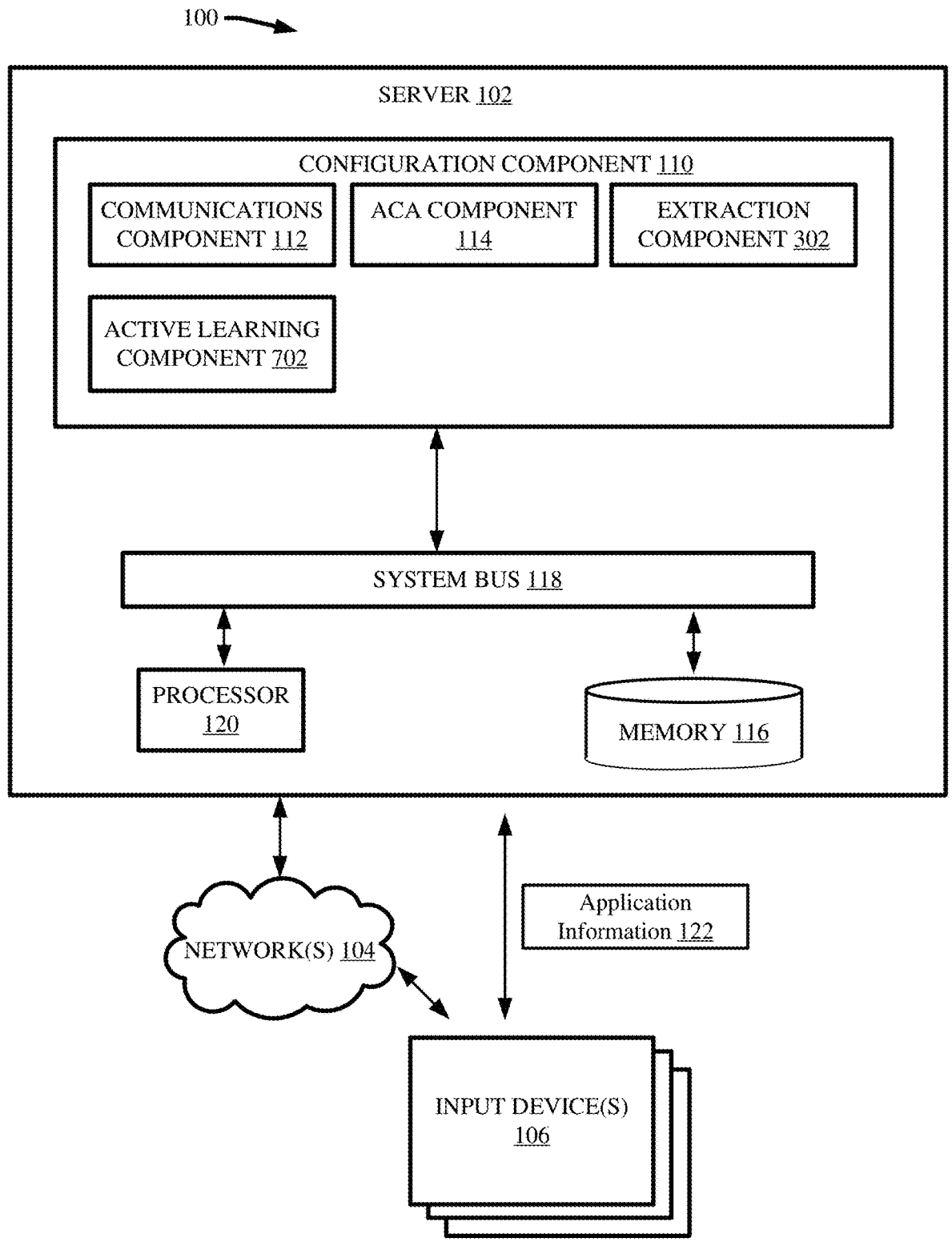
FIG. 7 illustrates a block diagram of an example, non-limiting system that can employ active learning to enhance the accuracy of one or more configuration determinations in accordance with one or more embodiments described herein.

FIG. 7 illustrates a diagram of the example, non-limiting system 100 further comprising active learning component 702 in accordance with one or more embodiments described herein. Repetitive description of like elements employed in other embodiments described herein is omitted for the sake of brevity. In one or more embodiments, the active learning component 702 can employ one or more active learning models to further enhance the accuracy of the environment attribute extractions.

In one or more embodiments, the active learning component 702 can collect and rank the extracted environment attributes. For example, the extracted environment attributes can be ranked based on one or more confidence metrics associated with the environment attributes, where the one or more confidence metrics can characterize an amount of confidence the system 100 has in the accuracy of the value component of extracted environment attributes. Further, the ranked, extracted environment attributes can be shared with the one or more users of the one or more applications (e.g., a SME for a given legacy application from which the environment attributes are extracted). In various embodiments, extracted environment attributes can be shared with the one or more users based on the environment attributes having an associate confidence metrics equal to or less than a defined threshold. Thereby, environment attributes with low confidence metrics (e.g., as compared to the defined threshold) can be augmented via user feedback. For example, the rank, extracted environment attributes can be shared with the one or more users for hit/miss labeling, where the one or more users can label the attributes as accurate or inaccurate. Based on the hit/miss labeling, the active learning component 702 can resolve ambiguities in the extracted environment attributes and/or conflicting information to yield more accurate value components.

Figure 8:
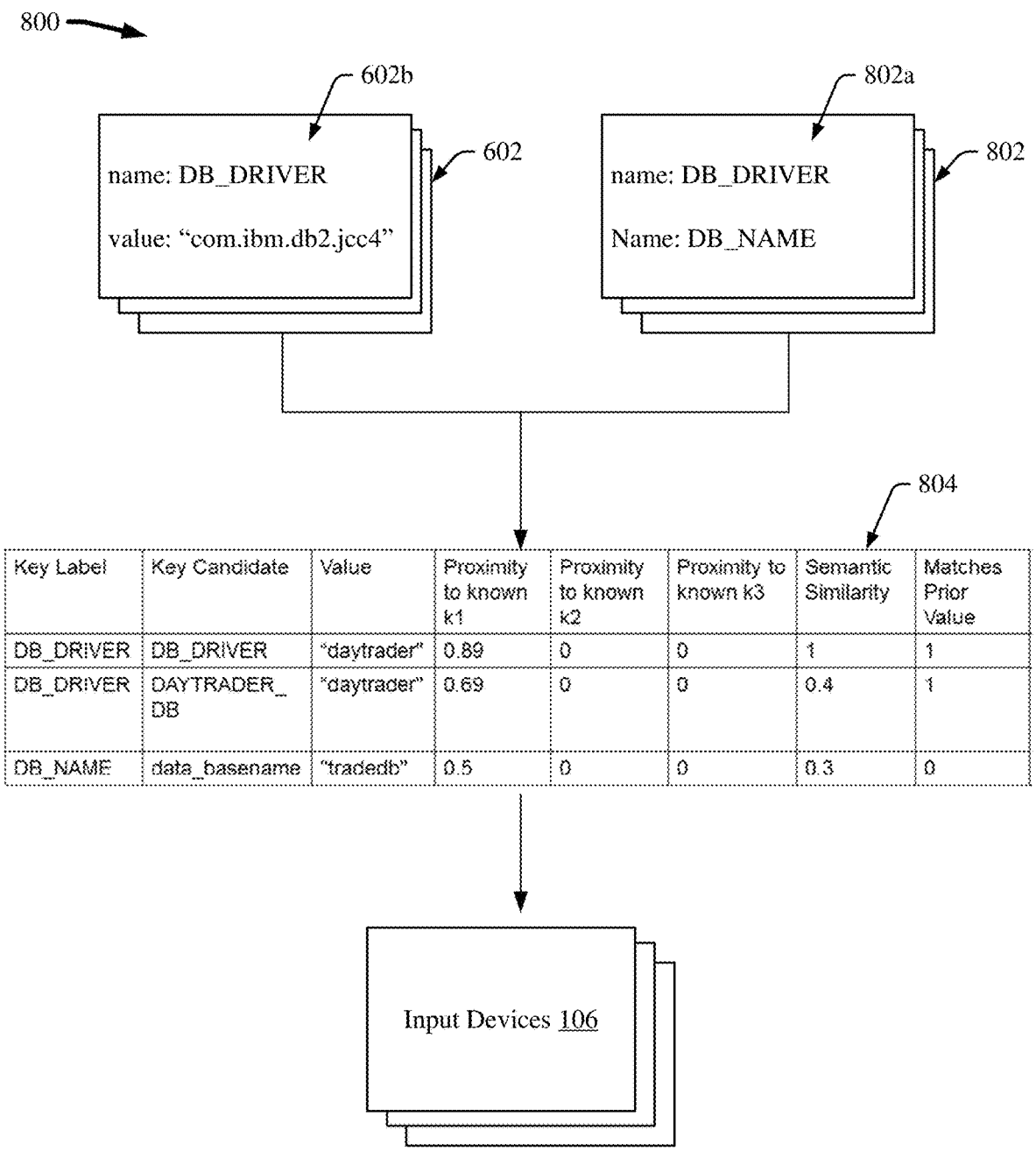
FIG. 8 illustrates a diagram of an example, non-limiting active learning model that can be employed to validate discovered configuration information in accordance with one or more embodiments described herein.

FIG. 8 illustrates a diagram of an example, non-limiting active learning scheme that can be employed by the active learning component 702 to train one or more classifiers of an active learning model in accordance with one or more embodiments described herein. Repetitive description of like elements employed in other embodiments described herein is omitted for the sake of brevity. As shown in FIG. 8, the active learning component 702 can analyze the one or more templates 602 generated by the extraction component 302 with reference to a required attribute collection 802. FIG. 8 depicts an example template 602*b* comprising environment attributes that can be extracted by the extraction component 302 in accordance with various embodiments described herein. Further, FIG. 8 depicts an example required attribute collection 802*a*, that can comprise environment attributes identified (e.g., by the active learning component 702) as required for execution and/or deployment of a given container.

For example, the active learning component 702 can curate a collection of environment attributes (e.g., <key, value> pairs) required for deploying a given container, which can comprise a given computer application (e.g., legacy application) in accordance with one or more recommendations generated by the ACA component 114. In one or more embodiments, the active learning component 702 can learn environmental attributes (e.g., key and/or value components) from user interaction (e.g., via the one or more input devices 106) and/or reuse learned environmental attributes for new datasets. Additionally, the active learning component 702 can curate a collection of extracted environment attributes (e.g., extracted via the extraction component 302 in accordance with various embodiments described herein). The active learning component 702 can then compare the collection of extracted environment attributes (e.g., comprised in the one or more templates 602) with the collection of required environment attributes (e.g., comprised within the one or more required attribute collections 802) to identify one or more value components for each key component of the required environment attributes.

For each key component of the required environment attributes, the active learning component 702 can generate a candidate list of the associate values from the extracted environment attributes. Further, the active learning component 702 can analyze each of the candidate values with regards to a plurality of metrics. Example metrics can include, but are not limited to: proximity to one or more known key value (e.g., known from similar key values such as database_host and/or mysql_database in the given example and represented in FIG. 8 as "Proximity to known k1," "Proximity to known k2," and/or "Proximity to known k3"; where k1, k2, and k3 can regard respective key values); semantic similarity between the key label (e.g., how the required attribute is presented) and the format of the key component associated with the value candidate, whether a value candidate matches a previous determined vale for the given key label of the required environment attribute, a combination thereof, and/or the like. For instance, where a database for an application is predetermined, such values can be used to map to a new entity that is similar to one or more existing entities. As shown in FIG. 8, the format the required environment attributes, candidate list, and determined metrics into a standardized format, such as table 804. In one or more embodiments, the candidate list can be ranked within the table 804 based on one or more of the computed metrics.

Additionally, the table 804 can be shared with one or more users (e.g., one or more SMEs with regards to the one or more containerized computer application) to facilitate the hit/miss labeling and/or remedy conflicting entries. In one or more embodiments, the table 804 can serve as a reference table for known and/or frequently used labels for KG entries. In various embodiments, the active learning component 702 can leverage previously generated tables 804 and/or previously performed hit/miss labeling to create training datasets with known environment attribute values. Further, the active learning model can utilize the training datasets to train one or more classifiers to facilitate future candidate list curations and/or metric computations. In one or more embodiments, the active learning component 702 can train one or more classifiers by generating a collection of environmental attributes (e.g., key and value pairs), shuffling the collection, and splitting the collection into known versus unknown data. Thereby, the active learning model can be trained for the known data and employed to predict the unknown data.

Figure 9:
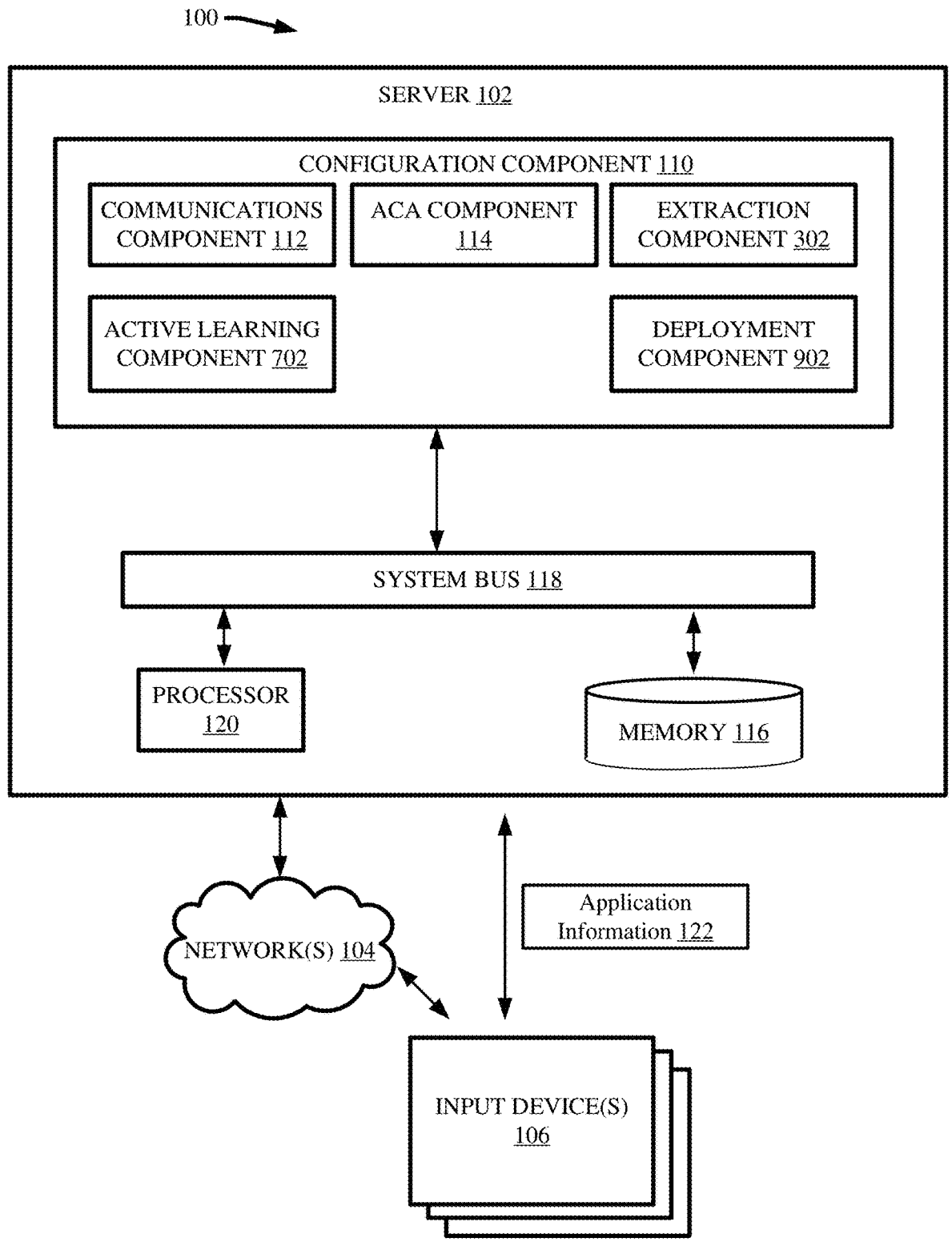
FIG. 9 illustrates a block diagram of an example, non-limiting system that can comprise generating one or more configuration files to facilitate deploying one or more computer applications in a modernized computing environment in accordance with one or more embodiments described herein.

FIG. 9 illustrates a diagram of the example, non-limiting system 100 further comprising deployment component 902 in accordance with one or more embodiments described herein. Repetitive description of like elements employed in other embodiments described herein is omitted for the sake of brevity. In various embodiments, the deployment component 902 can generate one or more configuration files for deployment of one or more of the containerized computer applications in a target computing environment. For example, deployment component 902 can generate the one or more configuration files based on the extracted environment attributes, where one or more of the extracted environments can include <key, value> pairs validated and/or augmented via the active learning component (e.g., based on user feedback). Further, the one or more configuration files can include the environment attributes mapped to a format compatible with the targeted deployment platform.

Figure 10:
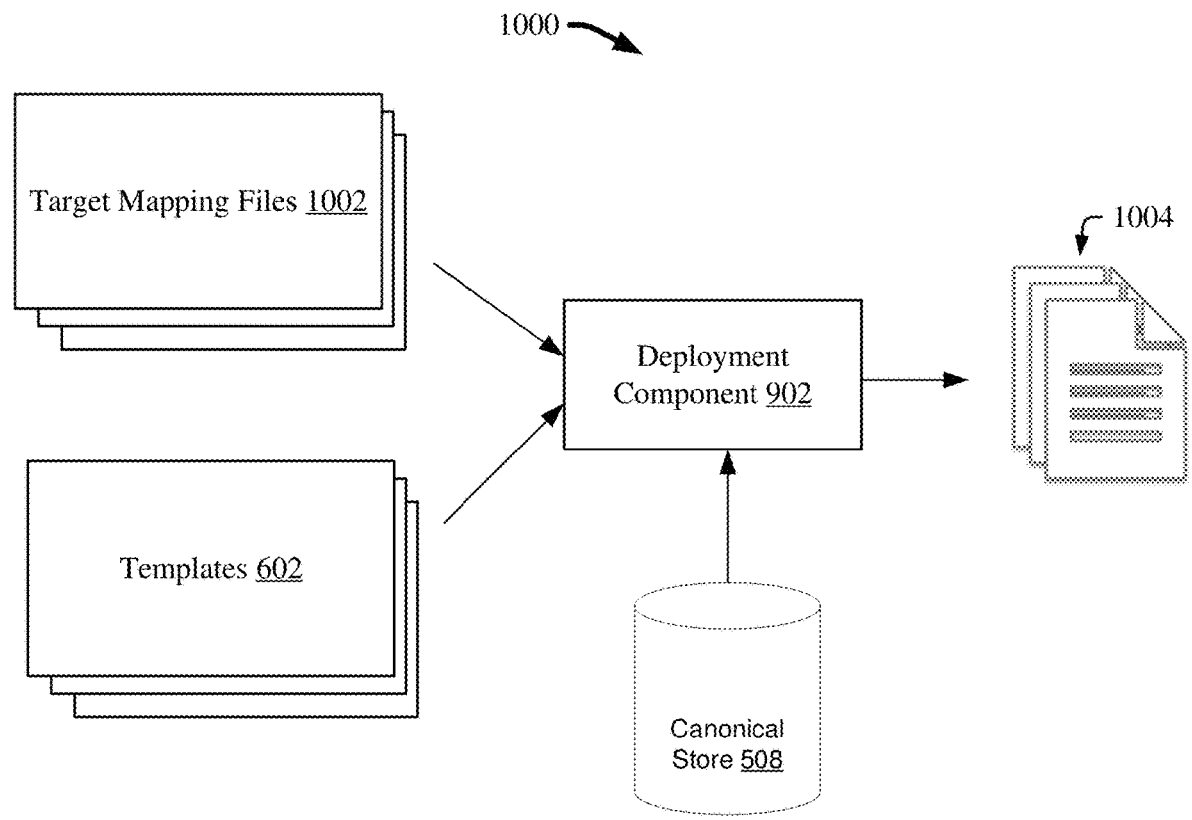
FIG. 10 illustrates a diagram of an example, non-limiting data transformation process that can facilitate the generation of one or more configuration files in accordance with one or more embodiments described herein.

FIG. 10 illustrates a diagram of an example, non-limiting configuration file generation 1000 that can be performed by the deployment component 902 in accordance with one or more embodiments described herein. Repetitive description of like elements employed in other embodiments described herein is omitted for the sake of brevity. As shown in FIG. 10, the deployment component 902 can accept as inputs one or more target mapping files 1002, one or more extracted templates 602, and/or canonical data 506 (e.g., stored in the one or more canonical storage 508) to generate one or more target configuration files 1004.

In accordance with various embodiments described herein, the one or more extracted templates 602 can comprise one or more extracted environment attributes. Further, the content of the one or more templates 602 can be validated and/or augmented via one or more active learning models (e.g., by the active learning component 702 in accordance with one or more embodiments described herein). Additionally, the deployment component 902 can retrieve the canonical data 506 from the one or more canonical storage 508. In accordance with various embodiments described herein, the canonical data 506 can include environment attributes extracted and/or standardized from one or more container descriptions via one or more crawler algorithms 502. In various embodiments, the one or more target mapping files 1002 can delineate one or more relationships between a format of the canonical data 506 and a format for the target configuration files 1004. For example, dependent on the target computer environment, environment attributes can be mapped and/or the relevant artifacts generated. Based on the one or more target mapping files 1002, the deployment component 902 can map environment attributes delineated in the templates 602 and/or canonical data 506 to a format employed by the target configuration files 1004. The format of the target configuration files 1004 can vary depending on the computing environment in which the given computer application will be deployed. Thus, transforming configuration information characterized by the plurality of extracted environment attributes into the one or more target configuration files can facilitate deploying one or more of the containerized computer application (e.g., legacy applications) into a modernized computing environment (e.g., a cloud computing environment).

Figure 11:
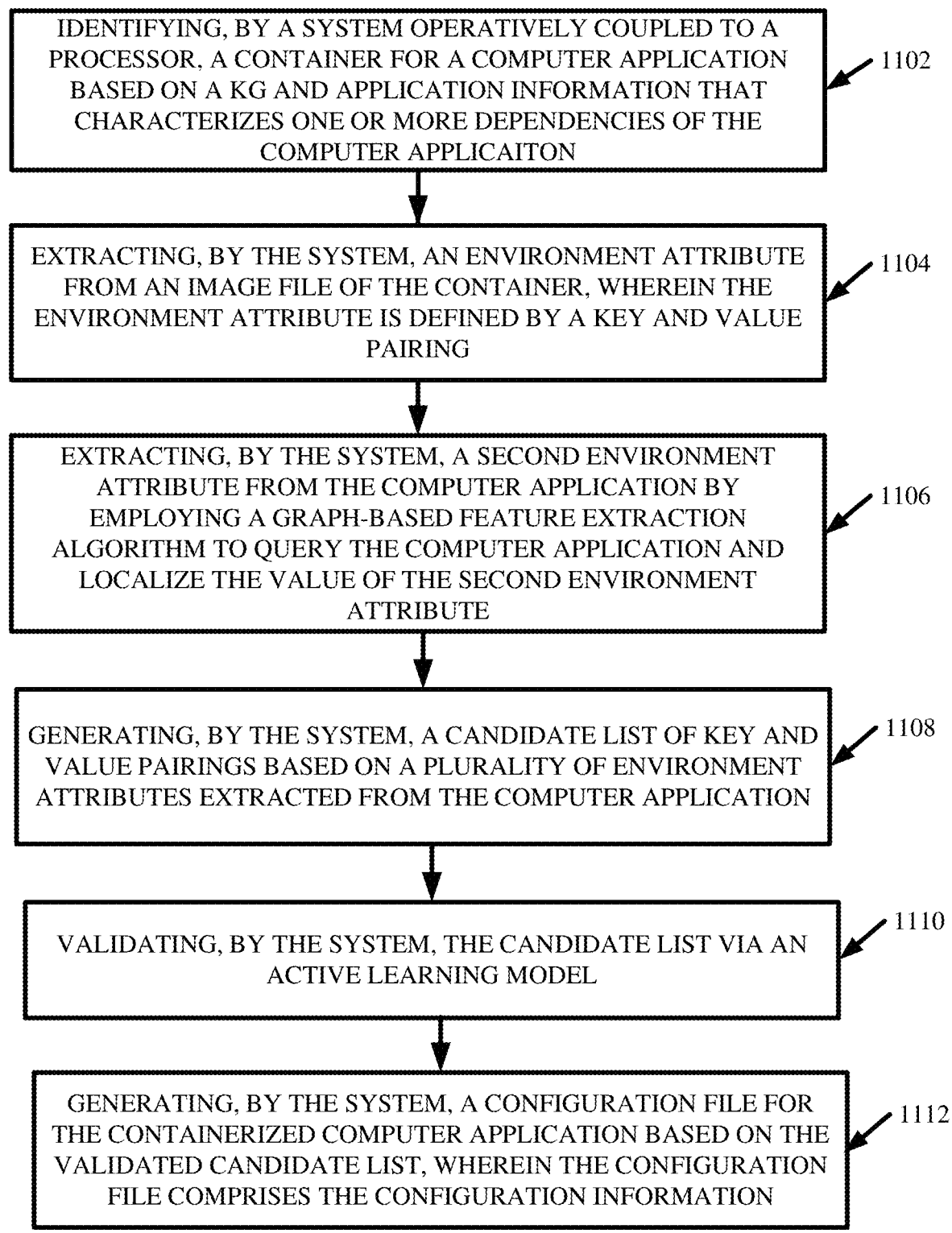
FIG. 11 illustrates a flow diagram of an example, non-limiting computer-implemented method that can be employed to automate the discovery of configuration information for one or more computer applications in accordance with one or more one or more embodiments described herein.

FIG. 11 illustrates a flow diagram of an example, non-limiting computer-implemented method 1100 that can be executed by the system 100 for configuration discovery regarding one or more computer application in accordance with one or more embodiments described herein. Repetitive description of like elements employed in other embodiments described herein is omitted for the sake of brevity.

At 1102, the computer-implemented method 1100 can comprise identifying (e.g., via ACA component 114), by a system 100 operatively coupled to a processor 120, one or more containers for one or more computer applications based on one or more KGs and/or application information 122 that can characterize one or more dependencies of the one or more computer applications. At 1104, the computer-implemented method 1100 can comprise extracting (e.g., via extraction component 302), by the system 100, one or more environment attributes from an image file of the container, where the one or more environment attributes can be defined by a key and value pairing. For example, the extraction component 302 can employ one or more crawler algorithms 502 to extract the one or more environment attributes from one or more container image descriptions in accordance with various embodiments described herein.

At 1106, the computer-implemented method 1100 can comprise extracting (e.g., via extraction component 302), by the system 100, one or more second environment attributes from the one or more computer applications by employing a graph-based feature extraction algorithm to query the computer application and localize the one or more value components. For example, the extraction component 302 can query the source code of the one or more computer applications in accordance with various embodiments described herein. At 1108, the computer-implemented method 1100 can comprise generating (e.g., via active learning component 702), by the system 100, one or more candidate lists of key and value pairings based on a plurality of environment attributes extracted from the one or more computer applications. For example, the active learning component 702 can generate one or more tables 804 in accordance with various embodiments described herein.

At 1110, the computer-implemented method 1100 can comprise validating (e.g., via the active learning component 702), by the system 100, the candidate list via an active learning model. For example, the candidate list can be shared with one or more SMEs for hit or miss labeling in accordance with various embodiments described herein. At 1112, the computer-implemented method 1100 can comprise generating (e.g., via deployment component 902), by the system 100, one or more configuration files for the one or more containerized computer applications based on the validated candidate list, where the one or more configuration files can comprise configuration information for deploying the one or more computer application in one or more target computing environments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
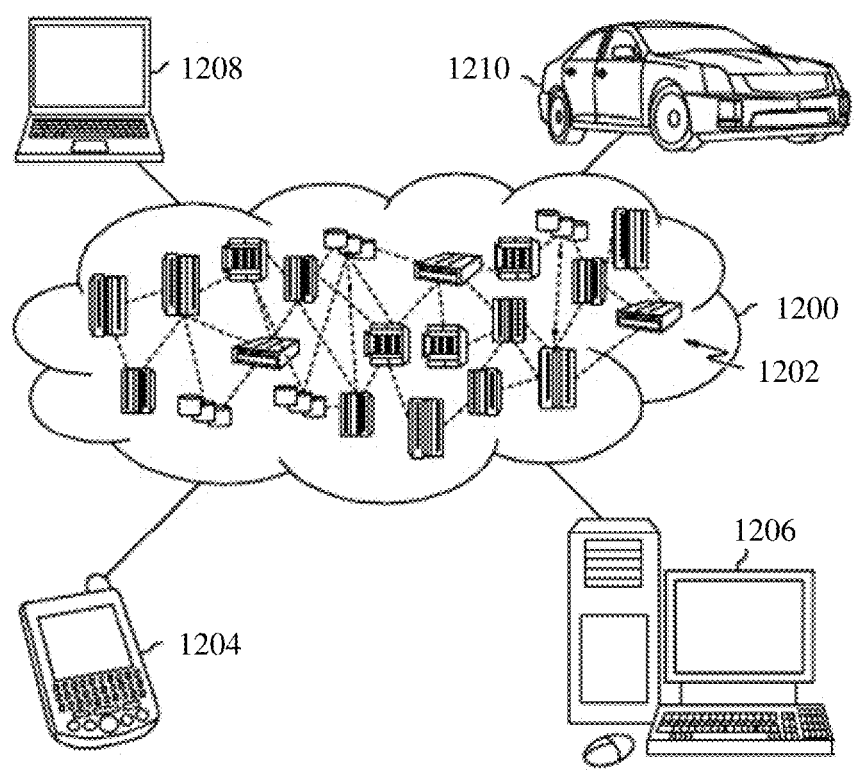
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
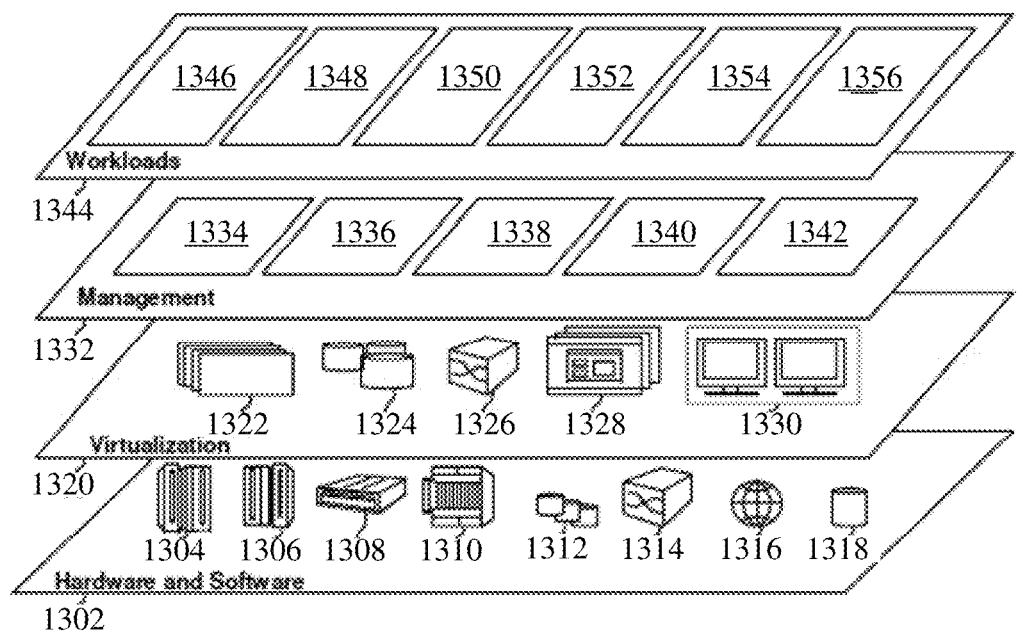
FIG. 13 depicts abstraction model layers in accordance with one or more embodiments described herein.

Referring now to FIG. 13, a set of functional abstraction layers provided by cloud computing environment 1200 (FIG. 12) is shown. Repetitive description of like elements employed in other embodiments described herein is omitted for the sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that required service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data analytics processing 1352; transaction processing 1354; and configuration discovery 1356. Various embodiments of the present invention can utilize the cloud computing environment described with reference to FIGS. 12 and 13 to collect application information 122 and/or extract environment attributes to facilitate the discovery of configuration information for one or more computer applications.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
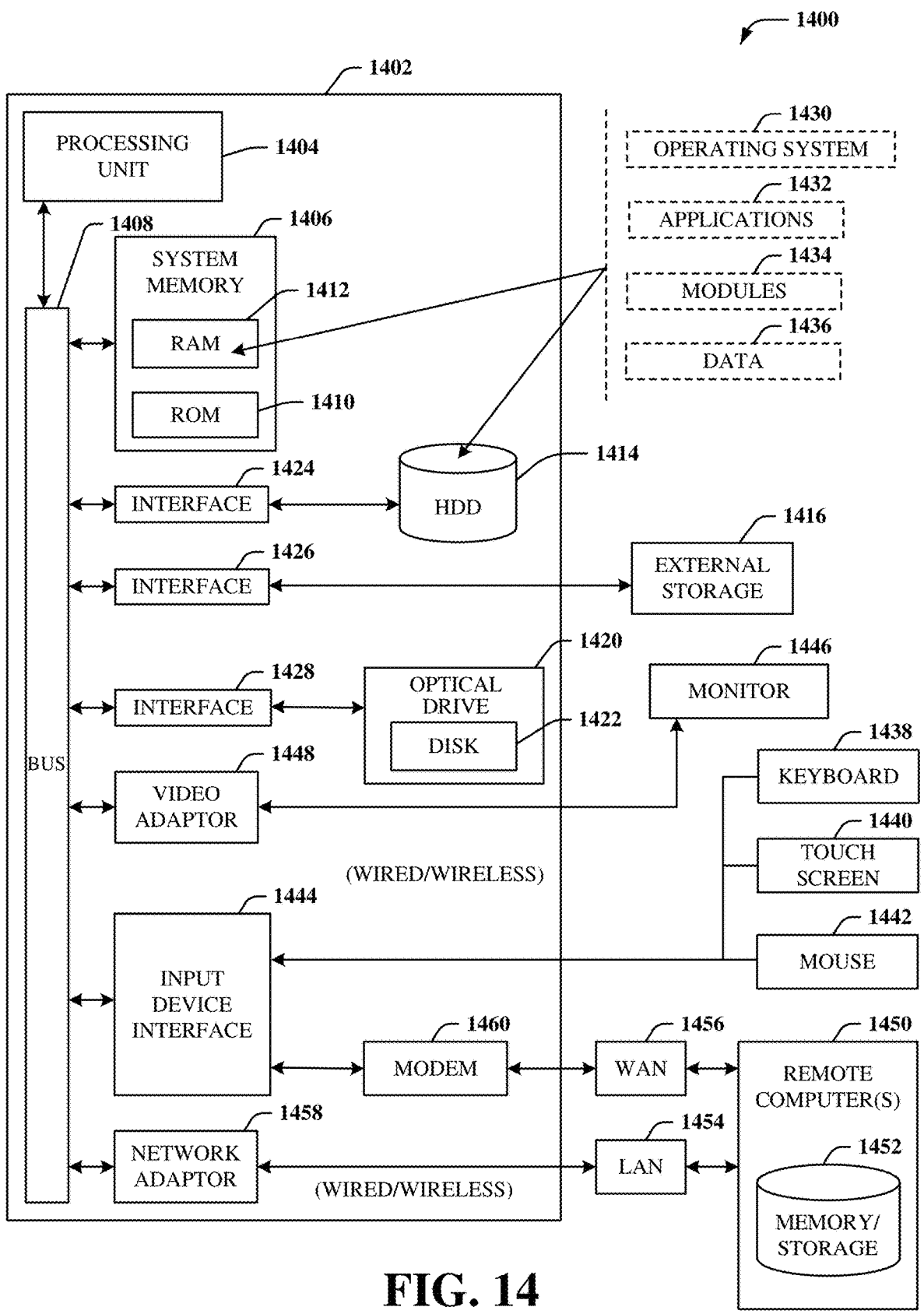
FIG. 14 illustrates a block diagram of an example, non-limiting operating environment in which one or more embodiments described herein can be facilitated.

In order to provide additional context for various embodiments described herein, FIG. 14 and the following discussion are intended to provide a general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system ("BIOS") can be stored in a non-volatile memory such as ROM, erasable programmable read only memory ("EPROM"), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive ("HDD") 1414 (e.g., EIDE, SATA), one or more external storage devices 1416 (e.g., a magnetic floppy disk drive ("FDD") 1416, a memory stick or flash drive reader, a memory card reader, a combination thereof, and/or the like) and an optical disk drive 1420 (e.g., which can read or write from a CD-ROM disc, a DVD, a BD, and/or the like). While the internal HDD 1414 is illustrated as located within the computer 1402, the internal HDD 1414 can also be configured for external use in a suitable chassis (not shown). Additionally, while not shown in environment 1400, a solid state drive ("SSD") could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine ("VM") of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1402, e.g., applied at the application execution level or at the operating system ("OS") kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, and/or the like.

A monitor 1446 or other type of display device can be also connected to the system bus 1408 via an interface, such as a video adapter 1448. In addition to the monitor 1446, a computer typically includes other peripheral output devices (not shown), such as speakers, printers, a combination thereof, and/or the like.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network ("LAN") 1454 and/or larger networks, e.g., a wide area network ("WAN") 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point ("AP") disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
   a memory that stores computer executable components; and
   a processor, operably coupled to the memory, and that executes the computer executable components stored in the memory, wherein the computer executable components comprise:
      an active learning component that trains an active learning model to generate candidate lists of values for environment attributes for deployments of containerized computer applications in target computing environments; and
      a configuration component that discovers, using the active learning model, configuration information associated with a containerized computer application, wherein the configuration information is characterized by a set of environment attributes extracted by querying a source code of the containerized computer application.

2. The system of claim 1, further comprising:
an application containerization advisory component that identifies, using the active learning model, a container for a computer application based on a knowledge graph and application information that characterizes one or more dependencies of the computer application.

3. The system of claim 2, further comprising:
an extraction component that extracts, using the active learning model, an environment attribute from an image file of the container, wherein the environment attribute is defined by a key and value pairing.

4. The system of claim 3, wherein the extraction component further extracts, using the active learning model, a second environment attribute from the computer application by employing a graph-based feature extraction algorithm to query the computer application and localize a value of the second environment attribute.

5. The system of claim 4, wherein a plurality of environment attributes are extracted from the computer application, and wherein the active learning component generates, using the active learning model, a candidate list of key and value pairings based on the plurality of environment attributes extracted from the computer application.

6. The system of claim 5, wherein the active learning component further validates, using the active learning model, the candidate list via an active learning model.

7. The system of claim 6, further comprising:
a deployment component that generates, using the active learning model, a configuration file for the containerized computer application for a target computing environment based on the validated candidate list, wherein the configuration file comprises the configuration information.

8. A computer-implemented method, comprising:
training, by a system operatively coupled to a processor, an active learning model to generate candidate lists of values for environment attributes for deployments of containerized computer applications in target computing environments; and
discovering, by the system, configuration information associated with a containerized computer application, wherein the configuration information is characterized by a set of environment attributes extracted by querying a source code of the containerized computer application.

9. The computer-implemented method of claim 8, further comprising:
identifying, by the system, using the active learning model, a container for a computer application based on a knowledge graph and application information that characterizes one or more dependencies of the computer application.

10. The computer-implemented method of claim 9, further comprising:
extracting, by the system, using the active learning model, an environment attribute from an image file of the container, wherein the environment attribute is defined by a key and value pairing.

11. The computer-implemented method of claim 10, further comprising:
extracting, by the system, using the active learning model, a second environment attribute from the computer application by employing a graph-based feature extraction algorithm to query the computer application and localize a value of the second environment attribute.

12. The computer-implemented method of claim 11, wherein a plurality of environment attributes are extracted from the computer application, and wherein the computer-implemented method further comprises:
generating, by the system, using the active learning model, a candidate list of key and value pairings based on the plurality of environment attributes extracted from the computer application.

13. The computer-implemented method of claim 12, further comprising:
validating, by the system, using the active learning model, the candidate list via an active learning model.

14. The computer-implemented method of claim 13, further comprising:
generating, by the system, using the active learning model, a configuration file for the containerized computer application based on the validated candidate list, wherein the configuration file comprises the configuration information.

15. A computer program product for computer application configuration discovery, the computer program product comprising a computer readable storage medium having program instructions embodied therewith, the program instructions executable by a processor to cause the processor to:
train, by the processor, an active learning model to generate candidate lists of values for environment attributes for deployments of containerized computer applications in target computing environments; and
discover, by the processor, configuration information associated with a containerized computer application, wherein the configuration information is characterized by a set of environment attributes extracted by querying a source code of the containerized computer application.

16. The computer program product of claim 15, wherein the program instructions further cause the processor to:
identify, by the processor, using the active learning model, a container for a computer application based on a knowledge graph and application information that characterizes one or more dependencies of the computer application.

17. The computer program product of claim 16, wherein the program instructions further cause the processor to:
extract, by the processor, using the active learning model, an environment attribute from an image file of the container, wherein the environment attribute is defined by a key and value pairing.

18. The computer program product of claim 17, wherein the program instructions further cause the processor to:
extract, by the processor, using the active learning model, a second environment attribute from the computer application by employing a graph-based feature extraction algorithm to query the computer application and localize a value of the second environment attribute.

19. The computer program product of claim 18, wherein a plurality of environment attributes are extracted from the computer application, and wherein the program instructions further cause the processor to:
generate, by the processor, using the active learning model, a candidate list of key and value pairings based on the plurality of environment attributes extracted from the computer application.

20. The computer program product of claim 19, wherein the program instructions further cause the processor to:
validate, by the processor, using the active learning model, the candidate list via an active learning model; and generate, by the processor, using the active learning model, a configuration file for the containerized computer application based on the validated candidate list, wherein the configuration file comprises the configuration information.

\* \* \* \* \*